United States Patent
Kazar et al.

(10) Patent No.: US 6,671,773 B2
(45) Date of Patent: Dec. 30, 2003

(54) METHOD AND SYSTEM FOR RESPONDING TO FILE SYSTEM REQUESTS

(75) Inventors: Michael L. Kazar, Pittsburgh, PA (US); Daniel S. Nydick, Wexford, PA (US); Richard N. Sanzi, Jr., Wexford, PA (US); Fred Gohh, Pittsburgh, PA (US); Ronald P. Bianchini, Jr., Pittsburgh, PA (US); Benjamin Speiser, Pittsburgh, PA (US)

(73) Assignee: Spinnaker Networks, LLC, Pittsburgh, PA (US)

( * ) Notice: Subject to any disclaimer, the term of this patent is extended or adjusted under 35 U.S.C. 154(b) by 334 days.

(21) Appl. No.: 09/732,121

(22) Filed: Dec. 7, 2000

(65) Prior Publication Data

US 2002/0116593 A1 Aug. 22, 2002

(51) Int. Cl.[7] .............................................. G06F 12/00
(52) U.S. Cl. ........................ 711/112; 709/229; 709/245
(58) Field of Search ......................... 711/111, 112, 113, 711/114, 154; 709/213, 229, 245

(56) References Cited

U.S. PATENT DOCUMENTS

| | | | |
|---|---|---|---|
| 6,453,354 B1 * | 9/2002 | Jiang et al. | 709/213 |
| 6,490,666 B1 * | 12/2002 | Cabrera et al. | 711/154 |
| 2002/0091898 A1 * | 7/2002 | Matsunami et al. | 711/114 |

OTHER PUBLICATIONS

Lee et al., Petal: Distributed Virtual Disks. Proceedings of the Seventh International Conference on Architectural Support for Programming Languages and Operating Systems (ASPLOS), p. 84–92, Oct. 1996.*

Gibson et al. Network Attached Storage Architecture. Communications of the ACM, v.43 n. 11, p. 37–45, Nov. 2000.*

Van Meter, R. A Brief Survey of Current Work on Network Attached Peripherals. ACM Operating Systems Review, pp. 63–70, Jan. 1996.*

* cited by examiner

Primary Examiner—Matthew Kim
Assistant Examiner—Woo H. Choi
(74) Attorney, Agent, or Firm—Ansel M. Schwartz

(57) ABSTRACT

A system for responding to file system requests having file IDs comprising V, a volume identifier specifying the file system being accessed, and R, an integer, specifying the file within the file system being accessed. The system includes D disk elements in which files are stored, where D is greater than or equal to 1 and is an integer. The system includes a switching fabric connected to the D disk elements to route requests to a corresponding disk element. The system includes N network elements connected to the switching fabric. Each network element has a mapping function that for every value of V, specifies one or more elements from the set D that store the data specified by volume V, where N is greater than or equal to 1 and is an integer and N+D is greater than or equal to 3, which receives the requests and causes the switching fabric to route the requests by their file ID according to the mapping function. A method for responding to file system requests. The method includes the steps of receiving file system requests having file IDs comprising V, a volume identifier specifying the file system being accessed, and R, an integer, specifying the file within the file system being accessed at network elements. Each network element has a mapping function that for every value of V, specifies one or more elements from the set D that store the data specified by volume V. Then there is the step of routing the requests to a switching fabric connected to the network elements based on the file system request's ID according to the mapping function to disk elements connected to the switching fabric.

14 Claims, 6 Drawing Sheets

METHOD AND SYSTEM FOR RESPONDING TO FILE SYSTEM REQUESTS

FIELD OF THE INVENTION

The present invention is related to file system requests. More specifically, the present invention is related to file system requests that are routed based on their file IDs in a system that has a plurality of network elements and disk elements that together appear as a single system that can respond to any request.

BACKGROUND OF THE INVENTION

Many uses exist for scaling servers so that an individual server can provide nearly unbounded space and performance. The present invention implements a very scalable network data server.

SUMMARY OF THE INVENTION

The present invention pertains to a system for responding to file system requests having file IDs comprising V, a volume identifier specifying the file system being accessed, and R, an integer, specifying the file within the file system being accessed. The system comprises D disk elements in which files are stored, where D is greater than or equal to 1 and is an integer. The system comprises a switching fabric connected to the D disk elements to route requests to a corresponding disk element. The system comprises N network elements connected to the switching fabric. Each network element has a mapping function that for every value of V, specifies one or more elements from the set D that store the data specified by volume V, where N is greater than or equal to 1 and is an integer and N+D is greater than or equal to 3, which receives the requests and causes the switching fabric to route the requests by their file ID according to the mapping function.

The present invention pertains to a method for responding to file system requests. The method comprises the steps of receiving file system requests having file IDs comprising V, a volume identifier specifying the file system being accessed, and R, an integer, specifying the file within the file system being accessed at network elements. Each network element has a mapping function that, for every value of V, specifies one or more elements from the set D that store the data specified by volume V. Then there is the step of routing the requests to a switching fabric connected to the network elements based on the file system request's ID according to the mapping function to disk elements connected to the switching fabric.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
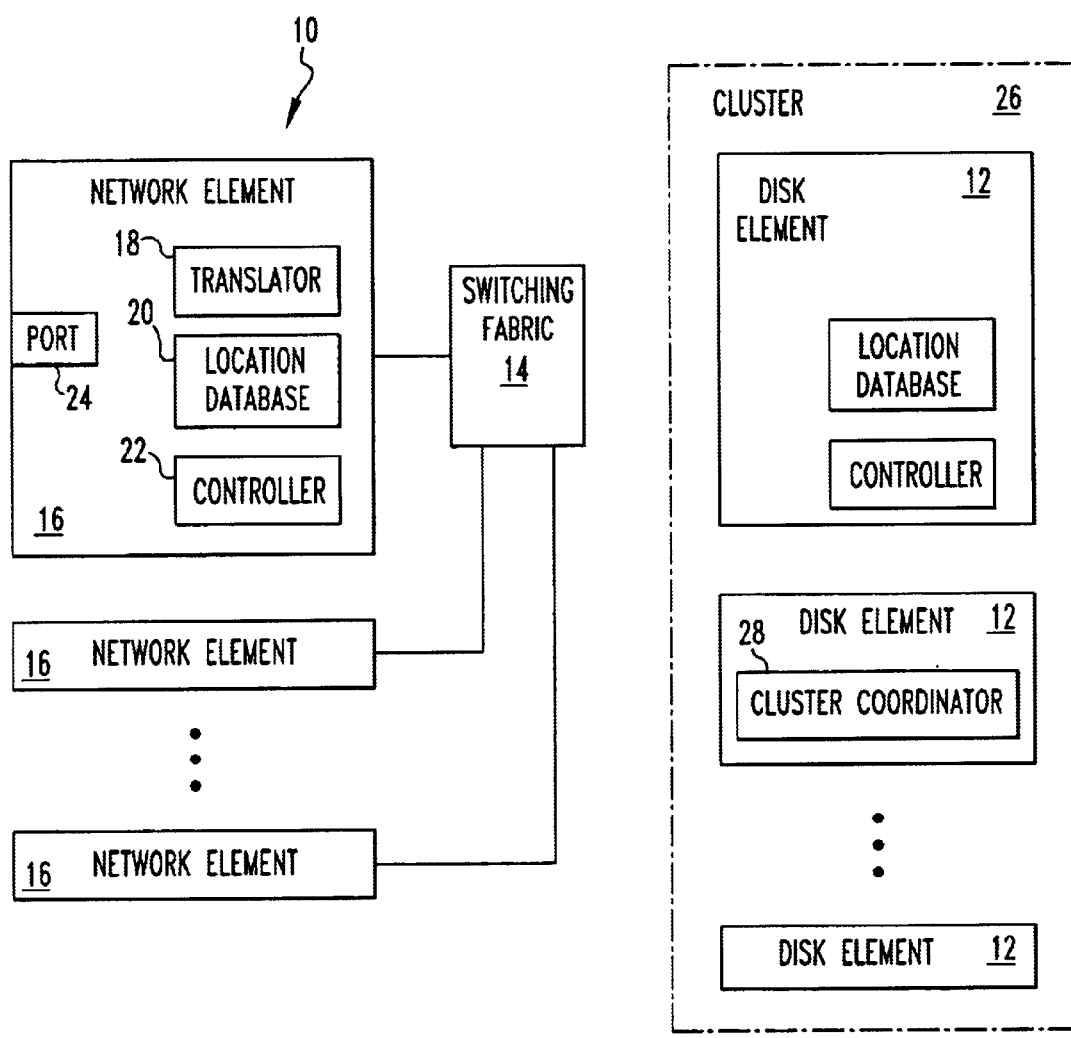
FIG. 1 is a schematic representation of a system of the present invention.

Referring now to the drawings wherein like reference numerals refer to similar or identical parts throughout the several views, and more specifically to FIG. 1 thereof, there is shown a system 10 for responding to file system 10 requests having file IDs comprising V, a volume identifier specifying the file system 10 being accessed, and R, an integer, specifying the file within the file system 10 being accessed. The system 10 comprises D disk elements 12 in which files are stored, where D is greater than or equal to 1 and is an integer. The system 10 comprises a switching fabric 14 connected to the D disk elements 12 to route requests to a corresponding disk element 12. The system 10 comprises N network elements 16 connected to the switching fabric 14. Each network element 16 has a mapping function that for every value of V, specifies one or more elements from the set D that store the data specified by volume V, where N is greater than or equal to 1 and is an integer and N+D is greater than or equal to 3, which receives the requests and causes the switching fabric 14 to route the requests by their file ID according to the mapping function.

Preferably, each network element 16 includes a translator 18 which obtains file IDs from path names included in individual file system 10 requests. Each disk element 12 and each network element 16 preferably has a file system 10 location database 20 which maintains a mapping from all file system 10 identifiers V to disk element 12 identifiers so each network element 16 can translate each file system 10 request ID into a corresponding disk element 12 location.

Preferably, each disk element 12 and each network element 16 has a controller 22, and each disk element 12 controller 22 communicates with the network element 16 controllers 22 to identify which files are stored at the respective disk element 12. Each network element 16 preferably can respond to any request for any disk element 12. Preferably, each network element 16 has a network port 24 through which requests are received by the respective network element 16 wherein all the network elements 16 and disk elements 12 together appear as a single system 10 that can respond to any request at any network port 24 of any network element 16. Network elements 16 and disk elements 12 are preferably added dynamically.

The disk elements 12 preferably form a cluster 26, with one of the disk elements 12 being a cluster 26 coordinator 28 which communicates with each disk element 12 in the cluster 26 to collect from and distribute to the network elements 16 which file systems 10 are stored in each disk element 12 of the cluster 26 at predetermined times. Preferably, the cluster 26 coordinator 28 determines if each disk element 12 is operating properly and redistributes requests for any disk element 12 that is not operating properly; and allocates virtual network interfaces to network elements 16 and assigns responsibility for the virtual network interfaces to network elements 16 for a failed network element 16.

Preferably, each network element 16 advertises the virtual interfaces it supports to all disk elements 12. Each disk element 12 preferably has all files with the same file system 10 ID for one or more values of V.

Preferably, each request has an active disk element 12 and a passive disk element 12 associated with each request, wherein if the active disk element 12 fails, the passive disk element 12 is used to respond to the request.

The requests preferably include NFS requests. Preferably, the requests include CIFS requests. The translator 18 preferably obtains the file IDs from path names contained within CIFS requests.

The present invention pertains to a method for responding to file system 10 requests. The method comprises the steps of receiving file system 10 requests having file IDs comprising V, a volume identifier specifying the file system 10 being accessed, and R, an integer, specifying the file within the file system 10 being accessed at network elements 16. Each network element 16 has a mapping function that for every value of V, specifies one or more elements from the set D that store the data specified by volume V. Then there is the step of routing the requests to a switching fabric 14 connected to the network elements 16 based on the file system 10 request's ID according to the mapping function to disk elements 12 connected to the switching fabric 14.

Preferably, the receiving step includes the step of obtaining the ID from path names included in the requests with a translator 18 of the network element 16. The routing step preferably includes the step of maintaining all disk element 12 locations at each file system 10 location database 20 of each disk element 12 and each network element 16 so each network element 16 can translate each file system 10 request ID into a corresponding disk element 12 location. Preferably, the receiving step includes the step of receiving requests at a network port 24 of the network element 16 which can respond to any request, and all the network elements 16 and disk elements 12 together appear as a single system 10.

The routing step preferably includes the step of collecting from and distributing to the disk elements 12 and the network elements 16, which form a cluster 26, which file systems 10 are stored in each disk element 12 by a cluster 26 coordinator 28, which is one of the disk elements 12 of the cluster 26, at predetermined times. Preferably, the routing step includes the step of redistributing requests from any disk elements 12 which are not operating properly to disk elements 12 which are operating properly by the network elements 16 which receive the requests. After the routing step, there is preferably the step of adding dynamically network elements 16 and disk elements 12 to the cluster 26 so the cluster 26 appears as one server and any host connected to any network port 24 can access any file located on any disk element 12.

Preferably, before the receiving step, there is the step of advertising by each network element 16 each virtual interface it supports. The obtaining step preferably includes the step of obtaining ID requests by the translator 18 of the network element 16 from path names contained in a CIFS request.

The present invention pertains to a system 10 for responding to file system 10 requests having file IDs comprising V, a volume identifier specifying the file system 10 being accessed, and R, an integer, specifying the file within the file system 10 being accessed. The system 10 comprises D disk elements 12 in which files are stored, where D is greater than or equal to 1 and is an integer. The system 10 comprises a switching fabric 14 connected to the D disk elements 12 to route requests to a corresponding disk element 12. The system 10 comprises N network elements 16 connected to the switching fabric 14. Each network element 16 has a mapping function that for every value of V, specifies one or more elements from the set D that store the data specified by volume V, where N is greater than or equal to 1 and is an integer and N+D is greater than or equal to 3, wherein network elements 16 and disk elements 12 can be added dynamically.

The present invention pertains to a system 10 for responding to file system 10 requests having file IDs comprising V, a volume identifier specifying the file system 10 being accessed, and R, an integer, specifying the file within the file system 10 being accessed. The system 10 comprises D disk elements 12 in which files are stored, where D is greater than or equal to 1 and is an integer. The system 10 comprises a switching fabric 14 connected to the D disk elements 12 to route requests to a corresponding disk element 12. The system 10 comprises N network elements 16 connected to the switching fabric 14. Each network element 16 has a mapping function that for every value of V, specifies one or more elements from the set D that store the data specified by volume V, where N is greater than or equal to 1 and is an integer and N+D is greater than or equal to 3. Each network element 16 has a network port 24 through which requests are received by the respective network element 16 and all the network elements 16 and disk elements 12 together appear as a single system 10 that can respond to any request at any network port 24 of any network element 16.

Figure 2:
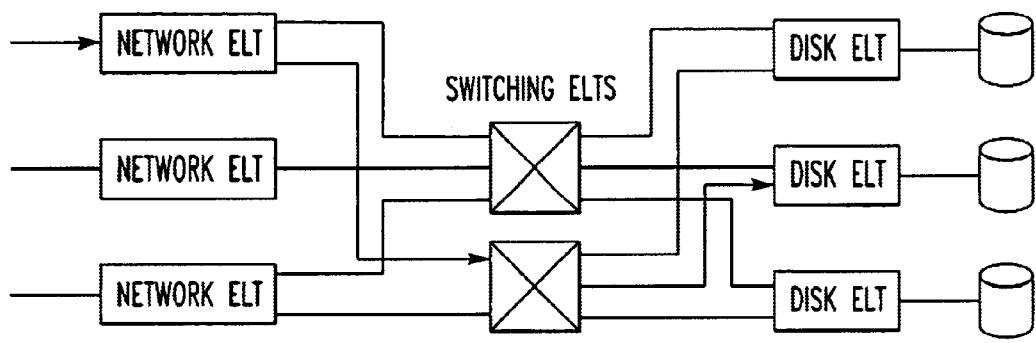
FIG. 2 is a schematic representation of the system of the present invention.

In the operation of the invention, the system 10 comprises a file server having one or more network elements 16, connected via one or more switching elements, to one or more disk elements 12, as shown in FIG. 2.

Standard network file system 10 requests, encoded as NFS, CIFS, or other network file system 10 protocol messages, arrive at the network elements 16 at the left, where the transport layer (TCP/IP) is terminated and the resulting byte stream is parsed into a sequence of simple file-level file system 10 requests. These requests are translated into a simpler backplane file system 10 protocol, hereafter called SpinFS. Any expensive authentication checking, such as the verification of encrypted information indicating that the request is authentic, is performed by the network element 16 before the corresponding SpinFS requests are issued.

The SpinFS requests are encapsulated over a remote procedure call (RPC) mechanism tailored for running efficiently over switched fabrics 14. The RPC allows many concurrent calls to be executing between the client and sender, so that calls having high latencies do not reduce the overall throughput in the system 10. The RPC ensures that dropped packets in the fabric 14 do not prevent requests from going from a network element 16 to a disk element 12, typically by retransmitting requests for which acknowledgments have not been received. The RPC guarantees that calls issued by a network element 16 are executed at most one time by a disk element 12, even in the case of retransmissions due to dropped packets or slow responses. These semantics are called "at most once" semantics for the RPC.

Once a command is parsed and authenticated, the network element 16 examines the description of the data in the request to see which disk element 12 stores the information specified in the request. The incoming request is interpreted, and SpinFS requests are dispatched to the disk element 12 or elements containing the relevant data. For some protocols, a single incoming request at a network element 16 will correspond to requests to a single disk element 12, while for other protocols, a single incoming request may map into several different requests possibly going to different disk elements 12.

The task of locating the disk element 12 or disk elements 12 to contact for any of these requests is the job of the network element 16, along with system 10 control software running in the network and disk elements 12. It is crucial for maintaining a single system 10 image that any network element 16 be able to send a request to any disk element 12, so that it can handle any incoming request transparently.

The SpinFS requests passed over the switching fabric 14 represent operations performed at a file level, not a raw disk block level. That is, files are named with opaque file IDs that have limited meaning outside of the disk element 12, and disk blocks are named as offsets within these file IDs.

SpinFS operations also describe updates to directory objects. Directories are special files whose contents implement a data structure that can efficiently map a file name within that directory into a file ID.

One component of the opaque file ID is a file system 10 ID. It is this component that can be translated into a disk element 12 location through the mechanism of a file system 10 location database 20 maintained and distributed throughout all network and disk elements 12 within a file server. Thus, all files with the same file system 10 ID reside on the same disk element 12 or elements.

Note that the network elements 16 can also interpret other protocols beyond basic file system 10 protocols. For example, the network element 16 might interpret the POP, SMTP and/or IMAP protocols, and implement them in terms of SpinFS operations.

A key aspect of the system 10 is that requests for any disk element 12 in the server may arrive at any network element 16. The network element 16, as part of processing an incoming request, can determine to which disk element 12 within the server a file system 10 request should be sent, but users outside of the server see the box as a single system 10 that can handle any request at any network port 24 attached to any network element 16.

The SpinFS operation passed over the switching fabric 14 include the following operations, all of which also return error codes as well as the specified parameters. All file names in this protocol are specified using UTF-8 encoding rules. The attached appendix includes all of the SpinFS calls' detailed syntax.

spin_lookup—Input: directory file ID, file names [4], flags. Output: Resulting file ID, number of names consumed. This call begins at the directory specified by the directory file ID, and looks up as many as 4 file names, starting at the specified directory, and continuing at the directory resulting from the previous lookup operation. One flag indicates whether the attributes of the resulting file should be returned along with the file ID, or whether the file ID alone should be returned. The other flag indicates whether the file names should be case-folded or not.

spin_readlink—Input: symlink file ID, flags. Output: link contents, optional attributes. The call returns the contents of a Unix symbolic link, or an error if the file specified by the file ID input parameter is not a symbolic link. The flags indicate whether the link's attributes should also be returned with the link's contents.

spin_read—Input: file ID, offset, count, flags. Output: data, optional attributes. The call reads the file specified by the input file ID at the specified offset in bytes, for the number of bytes specified by count, and returns this data. A flag indicates whether the file's attributes should also be returned to the caller.

spin_write—Input: file ID, length, offset, flags, expected additional bytes, data bytes. Output: pre and post attributes. This call writes data to the file specified by the file ID parameter. The data is written at the specified offset, and the length parameter indicates the number of bytes of data to write. An additional bytes parameter acts as a hint to the system 10, indicating how many more bytes the caller knows will be written to the file; it may be used as a hint to improve file system 10 disk block allocation. The flags indicate whether the pre and/or post attributes should be returned, and also indicate whether the data needs to be committed to stable storage before the call returns, as is typically required by some NFS write operations. The output parameters include the optional pre-operation attributes, which indicate the attributes before the operation was performed, and the optional post-operation attributes, giving the attributes of the file after the operation was performed.

spin_create—Input: dir file ID, file name, attributes, how and flags. Output: pre- and post-operation dir attributes, post-operation file attributes, the file ID of the file, and flags. The directory in which the file should be created is specified by the dir file ID parameter, and the new file's name is specified by the file name parameter. The how parameter indicates whether the file should be created exclusively (the operation should fail if the file exists), created as a superceded file (operation fails if file does not exist), or created normally (file is used if it exists, otherwise it is created). The flags indicate which of the returned optional attributes are desired, and whether case folding is applied to the file name matching or not, when checking for an already existing file. The optional output parameters give the attributes of the directory before and after the create operation is performed, as well as the attributes of the newly created target file. The call also returns the file ID of the newly created file.

spin_mkdir—Input: parent directory file ID, new directory name, new directory attributes, flags. Output: pre- and post-operation parent directory attributes, post-operation new directory attributes, new directory file ID. This operation creates a new directory with the specified file attributes and file name in the specified parent directory. The flags indicate which of the optional output parameters are actually returned. The optional attributes that may be returned are the attributes of the parent directory before and after the operation was performed, and the attributes of the new directory immediately after its creation. The call also returns the file ID of the newly created directory. This call returns an error if the directory already exists.

spin_symlink—Input: parent directory file ID, new link name, new link attributes, flags, link contents. Output: pre- and post-operation parent directory attributes, post-operation new symbolic link attributes, new directory file ID. This operation creates a new symbolic link with the specified file attributes and file name in the specified parent directory. The flags indicate which of the optional output parameters are actually returned. The link contents parameter is a string used to initialize the newly created symbolic link. The optional attributes are the attributes of the parent directory before and after the operation was performed, and the attributes of the new link immediately after its creation. The call also returns the file ID of the newly created link. This call returns an error if the link already exists.

spin_remove—Input: parent directory file ID, file name, flags. Output: pre- and post-operation directory attributes. This operation removes the file specified by the file name parameter from the directory specified by the dir file ID parameter. The flags parameter indicates which attributes should be returned. The optional returned attributes include the directory attributes before and after the operation was performed.

spin_rmdir—Input: parent directory file ID, directory name, flags. Output: pre- and post-operation directory attributes. This operation removes the directory specified by the directory name parameter from the directory specified by the dir file ID parameter. The directory must be empty before it can be removed. The flags parameter indicates which attributes should be returned. The optional returned attributes include the parent directory attributes before and after the operation was performed.

spin_rename—Input: source parent dir file ID, target parent dir file ID, source file name, target file name, flags. Output: source and target directory pre- and post-operation attributes. This operation moves or renames a file or directory from the parent source directory specified by the source dir file ID to the new parent target directory specified by target parent dir file ID. The name may be changed from the source to the target file name. If the target object exists before the operation is performed, and is of the same file type (file, directory or symbolic link) as the source object, then the target object is removed. If the object being moved is a directory, the target can be removed only if it is empty. If the object being moved is a directory, the link counts on the source and target directories must be updated, and the server must verify that the target directory is not a child of the directory being moved. The flags indicate which attributes are returned, and the returned attributes may be any of the source or target directory attributes, both before and/or after the operation is performed.

spin_link—Input: dir file ID, target file ID, link name, flags. Output: pre- and post-operation directory attributes, target file ID post-operation attributes. This operation creates a hard link to the target file, having the name specified by link name, and contained in the directory specified by the dir file ID. The flags indicate the attributes to return, which may include the pre- and post-operation directory attributes, as well as the post-operation attributes for the target file.

spin_commit—Input: file ID, offset, size, flags. Output: pre- and post-operation attributes. The operation ensures that all data written to the specified file starting at the offset specified and continuing for the number of bytes specified by the size parameter have all been written to stable storage. The flags parameter indicates which attributes to return to the caller. The optional output parameters include the attributes of the file before and after the operation is performed.

spin_lock—Input: file ID, offset, size, locking host, locking process, locking mode, timeout. Output: return code. This call obtains a file lock on the specified file, starting at the specified offset and continuing for size bytes. The lock is obtained on behalf of the locking process on the locking host, both of which are specified as 64 bit opaque fields. The mode indicates how the lock is to be obtained, and represents a combination of read or write data locks, and shared or exclusive CIFS operation locks. The timeout specifies the number of milliseconds that the caller is willing to wait, after which the call should return failure.

spin_lock_return—Input: file ID, offset, size, locking host, locking process, locking mode. Output: return code. This call returns a file lock on the specified file, starting at the specified offset and continuing for size bytes. The lock must have been obtained on behalf of the exact same locking process on the locking host as specified in this call. The mode indicates which locks are to be returned. Note that the range of bytes unlocked, and the modes being released, do not have to match exactly any single previous call to spin_lock; the call simply goes through all locks held by the locking host and process, and ensures that all locks on bytes in the range specified, for the modes specified, are released. Any other locks held on other bytes, or in other modes, are still held by the locking process and host, even those locks established by the same spin_lock call that locked some of the bytes whose locks were released here.

spin_client_grant—Input: file ID, offset, size, locking host, locking process, locking mode. Output: return code. This call notifies a client that a lock requested by an earlier spin_lock call that failed has now been granted a file lock on the specified file, starting at the specified offset and continuing for size bytes. The parameters match exactly those specified in the spin_lock call that failed.

spin_client_revoke—Input: file ID, offset, size, locking host, locking process, locking mode. Output: return code. This call notifies a client that the server would like to grant a lock that conflicts with the locking parameters specified in the call. If the revoked lock is an operation lock, the lock must be returned immediately. Its use for non-operation locks is currently undefined.

spin_fsstat—Input: file ID. Output: file system 10 status. This call returns the dynamic status of the file system 10 information for the file system 10 storing the file specified by the input file ID.

spin_get_bulk_attr—Input: VFS ID, inodeID [N]. Output: inodeID [N], status [N]. This call returns the file status for a set of files, whose file IDs are partially (except for the unique field) specified by the VFS ID and inodeID field. All files whose status is desired must be stored in the same virtual file system 10. The actual unique fields for the specified files are returned as part of the status fields in the output parameters, so that the caller can determine the exact file ID of the file whose attributes have been returned.

spin_readdir—Input: directory file ID, cookie, count, flags. Output: dir attributes, updated cookie, directory entries [N]. This call is used to enumerate entries from the directory specified by the dir file ID parameter. The cookie is an opaque (to the caller) field that the server can use to remember how far through the directory the caller has proceeded. The count gives the maximum number of entries that can be returned by the server in the response. The flags indicate whether the directory attributes should be included in the response. A directory is represented as a number of 32 byte directory blocks, sufficient to hold the entry's file name (which may contain up to 512 bytes) and inode information (4 bytes). The directory blocks returned are always returned in a multiple of 2048 bytes, or 64 entries. Each block includes a file name, a next name field, an inodeID field, and some block flags. These flags indicate whether the name block is the first for a given file name, the last for a given file name, or both. The inode field is valid only in the last block for a given file name. The next field in each block indicates the index in the set of returned directory blocks where the next directory block for this file name is stored. The next field is meaningless in the last directory block entry for a given file name.

spin_open—Input: file ID, file names [4], offset, size, locking host, locking process, locking mode, deny mode, open mode, flags, timeout. Output: file ID, names consumed, oplock returned, file attributes. This call combines in one SpinFS call a lookup, a file open and a file lock (spin_lock) call. The file ID specifies the directory at which to start the file name interpretation, and the file names array indicates a set of names to be successively looked up, starting at the directory file ID, as in the spin_lookup call described above. Once the final target is determined, the file is locked using the locking host, locking process, locking mode and timeout parameters. Finally, the file is opened in the specified open mode (read, write, both or none), and with the specified deny modes (no other readers, no other writers, neither or both). The output parameters include the number of names consumed, the optional file attributes, and the oplock returned, if any (the desired oplock is specified along with the other locking mode input parameters).

The remote procedure call is now described. The remote procedure call mechanism, called RF, that connects the various network and disk elements 12 in the architecture above. The RF protocol, which can run over ethernet, fibrechannel, or any other communications medium, provides "at most once" semantics for calls made between components of the system 10, retransmissions in the case of message loss, flow control in the case of network congestion, and resource isolation on the server to prevent deadlocks when one class of request tries to consume resources required by the server to process the earlier received requests. Resource priorities are associated with calls to ensure that high priority requests are processed before lower priority requests.

One fundamental structure in RF is the connection, which connects a single source with a single destination at a certain priority. A connection is unidirectional, and thus has a client side and server side, with calls going from the client to the server, and responses flowing back from the server to the client. Each call typically has a response, but some calls need not provide a response, depending upon the specific semantics associated with the calls. Connections are labeled with a connection ID, which must be unique within the client and server systems connected by the connection.

In this architecture, a source or destination names a particular network or disk element 12 within the cluster 26. Network and disk elements 12 are addressed by a 32 bit blade address, allocated by the cluster 26 control processor during system 10 configuration.

Each connection multiplexes a number of client side channels, and a single channel can be used for one call at a time. A channel can be used for different calls made by the client at different times, on different connections. Thus, channel 3 may be connected temporarily to one connection for call 4, and then when call 5 is made on channel 3, it may be made on a completely different connection.

Any given connection is associated with a single server, and several connections can share the same server. A server consists of a collection of threads, along with a set of priority thresholds indicating how many threads are reserved for requests of various priorities. When a call arrives from a connection at the server end of the connection, the priority of the connection is examined, and if the server has any threads available for servicing requests with that priority, the request is dispatched to the thread for execution. When the request completes, a response is generated and queued for transmission back to the client side of the connection.

Note that a request can consist of more data than fits in a particular packet, since RF must operate over networks with a 1500 byte MTU, such as ethernet, and a request can be larger than 1500 bytes. This means that the RF send and receive operations need to be prepared to send more than one packet to send a given request. The fragmentation mechanism used by RF is simple, in that fragments of a given request on a given connection can not be intermixed with fragments from another call within that connection.

Acknowledgment packets are used for transmitting connection state between clients and servers without transmitting requests or responses at the same time.

Figure 3:
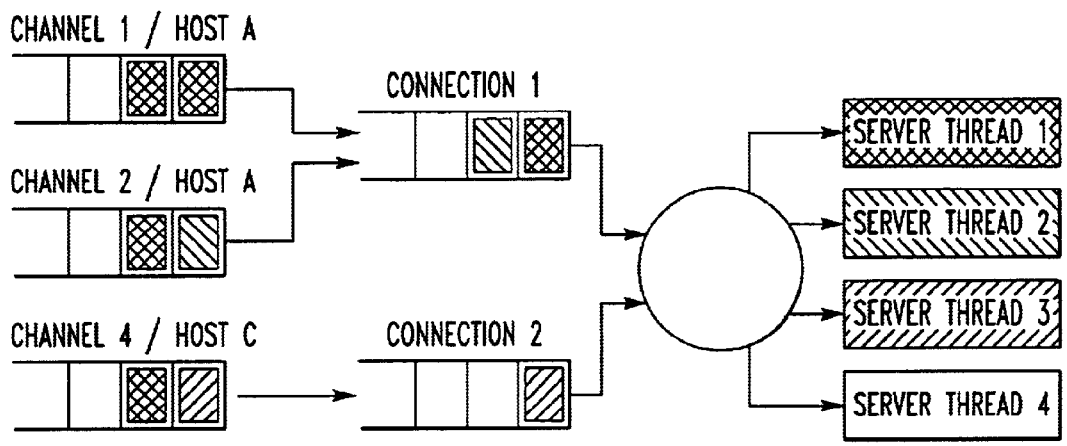
FIG. 3 is a schematic representation of data flows between the client and the server.

FIG. 3 shows the approximate data flows between the client and the server. Requests on host A are made on channels 1 and 2 on that host, and queued on a FIFO basis into connection 1. Note that a second request on any channel (e.g. channel 1) would typically not be queued until that channel's first request had been responded to. Thus, it would not be expected that the channel 1's firs two requests to execute concurrently, nor the two requests in channel 2, nor the two requests in channel 4. However, requests queued to the same connection are executed in parallel, so that the first request in channel 1 and the first request in channel 2 would execute concurrently given sufficient server resources.

In this example, channels 1 and 2 are multiplexed onto connection 1, and thus connection 1 contains a request from each channel, which are both transmitted as soon as they are available to the server, and dispatched to threads 1 and 2. When the request on channel 1 is responded to, the channel becomes available to new requests, and channel 1's second request is then queued on that channel and passed to the server via channel 1. Similarly, on host C, channel 4's first request is queued to connection 2. Once the request is responded to, channel 4 will become available again, and channel 4's second request will be sent.

The table below describes the fields in an Ethernet packet that contains an RF request:

| Field bytes | Field name | Description |
| --- | --- | --- |
| 6 | DestAddr | Destination blade address |
| 6 | SourceAddr | Source blade address |
| 2 | PacketType | Ethernet packet type |

The next table describes the RF-specific fields that describe the request being passed. After this header, the data part of the request or response is provided.

| Field bytes | Field name | Description |
| --- | --- | --- |
| 4 | ConnID | Connection ID |
| 4 | ChannelID | Client-chosen channel number |
| 4 | Call | Call number within channel |
| 4 | Sequence | Sequence number within connection |
| 4 | SequenceAck | All packets < SequenceAck have been received on this connection |

-continued

| Field bytes | Field name | Description |
| --- | --- | --- |
| 2 | Window | Number of packets at SequenceAck or beyond that the receiver may send |
| 1 | Flags | bit 0 => ACK immediately<br>bit 1 => ACK packet<br>bits 2–4 => priority<br>bit 5 => last fragment |
| 1 | Fragment | The fragment ID of this packet (0-based) |

The connection ID is the shared, agreed-upon value identifying this connection.

The client-side operation is now described. When a client needs to make a call to a server, the client specifies a connection to use. The connection has an associated set of channels (typically shared among a large number of connections), and a free channel is selected. The channel contains a call number to use, and that number becomes the Call number in the request packet. At this point, all fields can be generated for the request except for the Sequence, SequenceAck, Window fields and ACK immediately field in the Flags field.

At this point, the request is moved to the connection queue, where the request is assigned a Sequence number.

The connection state machine transmits packets from the head of the connection queue, periodically requesting acknowledgements as long as there is available window for sending. When the window is closed, or while there are outstanding unacknowledged data in the transmission queue, the connection state machine retransmits the packet at the head of the transmission queue until a response is received.

Upon receipt of a message from the server side, the connection state machine examines the SequenceAck field of the incoming packet and releases all queued buffers whose Sequence field is less than the incoming SequenceAck field. If the packet is a response packet (rather than simply an ACK packet), the response is matched against the expected Call number for the specified ChannelID. If the channel is in the running state (expecting a response), and if this Call number is the call number expected by this channel, the response belongs to this call, and is queued for the channel until all fragments for this call have been received (that is, until the fragment with the "last fragment" Flag bit is received). At this point, the response is passed to the thread waiting for a response, and the client side channel is placed in the free list again, waiting for the next call to be made. When the client thread is done with the response buffers, they are placed back in the buffer free queue.

While a call is executing, the client side needs an end-to-end timeout to handle server side problems, including bugs and system 10 restarts. Thus, when a channel begins executing a new call, a timer entry is allocated to cancel the call, and if this timer expires while the call is executing, the call is aborted. In this case, an error is reported back to the calling thread, and the channel's call number is incremented as if the call completed successfully.

The server side operation is now described. On the server side of the system 10, an incoming request is handled by first sending an immediate acknowledgement, if requested by the packet. Then the new request is dispatched to an available thread, if any, based upon the incoming connection's priority and the context priority threshold settings. The request may be fragmented, in which case the request is not dispatched to a server thread until an entire request has been received, based upon receiving the last packet with the "last fragment" flag bit set.

Each executing request requires a little bit of state information, so that the response packet can be generated. This context includes a reference to the connection, as well as the call's ChannelID and Call fields. These fields are passed to the executing server thread at the start of a call, and are passed back to the RF mechanism when a response needs to be generated.

When a response is ready to be sent, the server thread passes the connection, ChannelID and Call to the RF mechanism, along with the response buffer to be passed back to the caller. The RF state machine allocates the next Sequence value for the response, allocates the necessary packets for the fragments of the response, and then queues the response buffers. Note that the response buffer(s) are sent immediately if there is sufficient window space available, and queued otherwise, and that individual fragments may be transmitted while others are queued, if the available window space does not allow the entire response to be transmitted immediately.

Network elements 16 are now described. The network element 16 is a simple implementation of NFS requests in terms of SpinFS requests. SpinFS is functionally a superset of NFS version 3, so any NFS operation can be mapped directly into a SpinFS operation. For most operations, the parameters in the NFS specification (RFC 1813 from www.ietf.org, incorporated by reference herein) define all of the corresponding SpinFS operation's parameters. The exceptions are listed below:

nfs_lookup: map into spin_lookup call with one pathname parameter, and case folding disabled. Number of names consumed must be one on return, or return ENOENT.

nfs_getattr: This call is mapped into a spin_get_bulk_attr call requesting the status of a single inode.

nfs_readdir, nfs_fsstat, nfs_remove, nfs_rmdir, nfs_mkdir, nfs_rename, nfs_link, nfs_commit, and nfs_symlink: map directly into corresponding spin_xxx call, e.g. nfs_mkdir has the same parameters as spin_mkdir.

Figure 4:
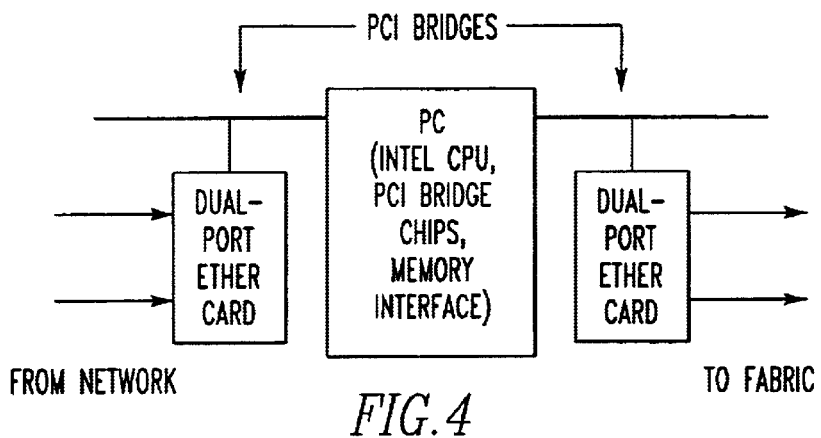
FIG. 4 is a schematic representation of a PCI bus attached to one Ethernet adapter card and another PCI bus attached to another Ethernet card.

There are many possible architectures for a network element 16, implementing an NFS server implemented on top of another networking protocol. The system 10 uses a simple one with a PC containing two PCI buses. One PCI bus attaches to one Ethernet adapter card, and is used for receiving NFS requests and for sending NFS responses. The other PCI bus attaches to another Ethernet card and is used for sending SpinFS requests and for receiving SpinFS responses. FIG. 4 shows this.

The PC reads incoming requests from the network-side Ethernet card, translates the request into the appropriate one or more SpinFS requests, and sends the outgoing requests out to the fabric 14 via the second, fabric-side, Ethernet card.

Disk elements 12 are now described. The disk element 12 is essentially an NFS server, where the requests are received by the fabric RPC (RF, described above) instead of via the usual Sun RPC protocol. The basic NFS server can be obtained from Red Hat Linux version 6.1. The directory /usr/src/linux/fs/nfsd contains an implementation of the NFS server, and each function is implemented by a function in /usr/src/linux/fs/nfsd/nfs3proc.c. The code herein must be modified to remove the exported file system 10 check based on the incoming RPC's source address, and the credential field must be copied from the SpinFS request's credential structure instead of a Sun RPC credential field.

In addition, a correct SpinFS implementation able to handle clustered NFS operations needs to specially handle the following additional SpinFS parameters in the incoming SpinFS calls:

spin_bulk_getattr: This call is a bulk version of nfs_getattr, and is implemented by calling nfs_getattr repeatedly with each file ID in the incoming list of files whose status is desired.

spin_lookup: This call is a bulk version of nfs_lookup, and is implemented by calling nfs_lookup with each component in the incoming spin_lookup call in turn. If an error occurs before the end of the name list is encountered, the call returns an indication of how many names were processed, and what the terminating error was.

The spin_open, spin_lock, spin_lock return, spin_client revoke, spin_client_grant calls are only used when implementing other (not NFS) file system 10 protocols on top of SpinFS, and thus can simply return an error when doing a simple NFS clustering implementation.

Figure 5:
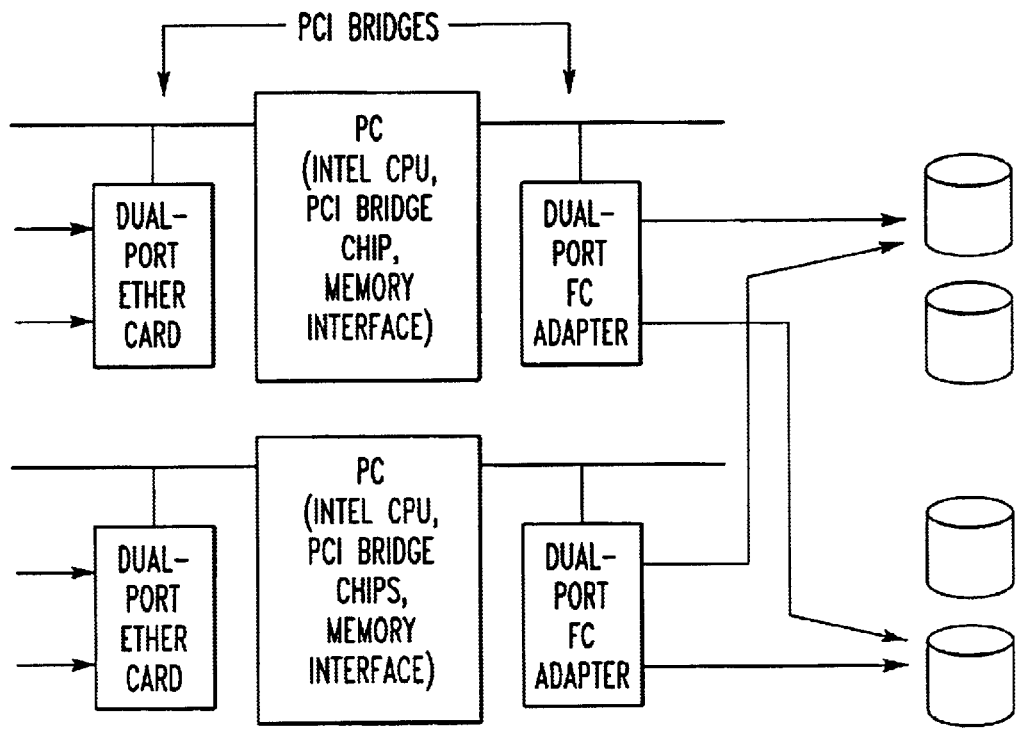
FIG. 5 shows one PCI bus attached to one Ethernet adapter card and another PCI bus attached to a fiberchannel host bus adapter.

There are many possible architectures for a disk element 12, implementing a SpinFS server. The system 10 uses a simple one with a PC containing two PCI buses. One PCI bus attaches to one Ethernet adapter card, and is used for receiving SpinFS requests from the fabric 14, and for sending SpinFS responses to the fabric 14. The other PCI bus attaches to a fibrechannel host bus adapter, and is used to access the dual ported disks (the disks are typically attached to two different disk elements 12, so that the failure of one disk element 12 does not make the data inaccessible). FIG. 5 shows this system 10 with two disk elements 12.

The PC reads incoming SpinFS requests from the network-side Ethernet card, implements the SpinFS file server protocol and reads and writes to the attached disks as necessary. Upon failure of a disk element 12, the other disk element 12 having connectivity to the failed disk elements 12 disks can step in and provide access to the data shared on those disks, as well as to the disks originally allocated to the other disk element 12.

There are a few pieces of infrastructure that support this clustering mechanism. These are described in more detail below.

All elements in the system 10 need to know, for each file system 10, the disk element 12 at which that file system 10 is stored (for replicated file systems, each element must know where the writing site is, as well as all read-only replicas, and for failover pairs, each element must know where the active and passive disk elements 12 for a given file system are located).

This information is maintained by having one element in the cluster 26 elected a cluster 26 coordinator 28, via a spanning tree protocol that elects a spanning tree root. The spanning tree root is used as the coordinator 28. The coordinator 28 consults each disk element 12 and determines which file systems 10 are stored there. It prepares a database 20 mapping each file system 10 to one or more (disk element 12, property) pairs. The property field for a file system 10 location element indicates one of the set {single, writing replica, read-only replica, active failover, passive failover}, indicating the type of operations that should be forwarded to that particular disk element 12 for that particular file system 10. This information is collected and redistributed every 30 seconds to all elements in the cluster 26.

The coordinator 28 elected by the spanning tree protocol above also has responsibility for determining and advertising, for each cluster 26 element, whether that element is functioning properly. The coordinator 28 pings each element periodically, and records the state of the element. It then distributes the state of each element periodically to all elements, at the same time that it is distributing the file system 10 location database 20 to all the cluster 26 elements.

Note that the coordinator 28 also chooses the active failover element and the passive failover element, based upon which elements are functioning at any given instant for a file system 10. It also chooses the writing disk element 12 from the set of replica disk elements 12 for a file system 10, again based on the criterion that there must be one functioning writing replica for a given file system 10 before updates can be made to that file system 10.

The last piece of related functionality that the cluster 26 coordinator 28 performs is that of allocating virtual network interfaces to network elements 16. Normally, each network element 16 has a set of virtual interfaces corresponding to the physical network interfaces directly attached to the network element 16. However, upon the failure of a network element 16, the cluster 26 coordinator 28 assigns responsibility for the virtual interfaces handled by the failed network element 16 to surviving network elements 16.

Figure 6:
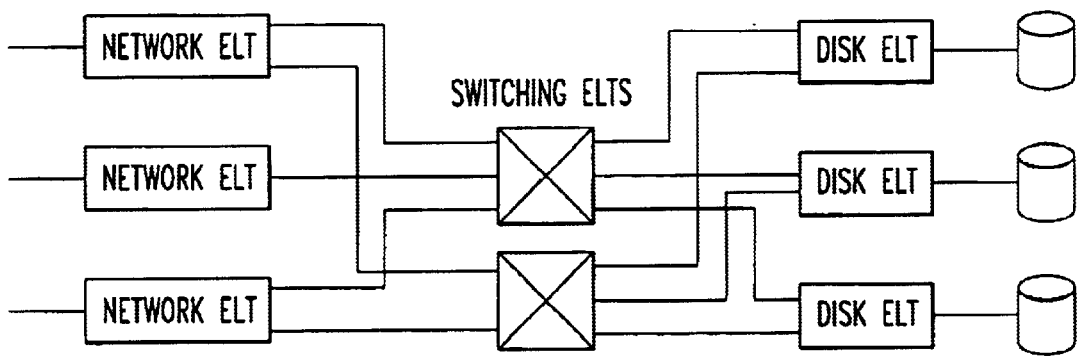
FIGS. 6 and 7 are schematic representations of a virtual interface being relocated from a failed network element to a surviving element.
Figure 7:
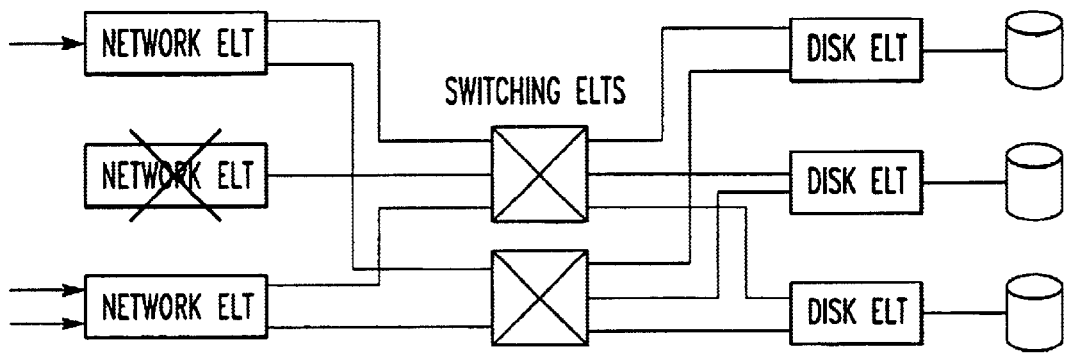

FIGS. 6 and 7 show a virtual interface being relocated from a failed network element 16 to a surviving element:

After a failure occurs on the middle network element 16, the green interface is reassigned to a surviving network element 16, in this case, the bottom interface.

The MAC address is assumed by the surviving network element 16, and the new element also picks up support for the IP addresses that were supported by the failed element on its interface. The surviving network element 16 sends out a broadcast packet with its new source MAC address so that any ethernet switches outside of the cluster 26 learn the new Ethernet port to MAC address mapping quickly.

The data and management operations involved in the normal operation of the system 10 are described. Each type of operation is examined and how these operations are performed by the system 10 is described.

Clustering is now described. This system 10 supports clustering: a number of network elements 16 and disk elements 12 connected with a switched network, such that additional elements can be added dynamically. The entire cluster 26 must appear as one server, so that any host connected to any network port 24 can access any file located on any disk element 12.

This is achieved with the system 10 by distributing knowledge of the location of all file systems 10 to all network elements 16. When a network element 16 receives a request, it consults its local copy of the file system 10 location database 20 to determine which disk element(s) 12 can handle the request, and then forwards SpinFS requests to one of those disk elements 12.

The disk elements 12 do, from time to time, need to send an outgoing request back to a client. Thus, network elements 16 also advertise the virtual interfaces that they support to all the disk elements 12. Thus, when a disk element 12 needs to send a message (called a callback message) back to a client, it can do so by consulting its virtual interface table and sending the callback request to the network element 16 that is currently serving that virtual interface.

Figure 8:
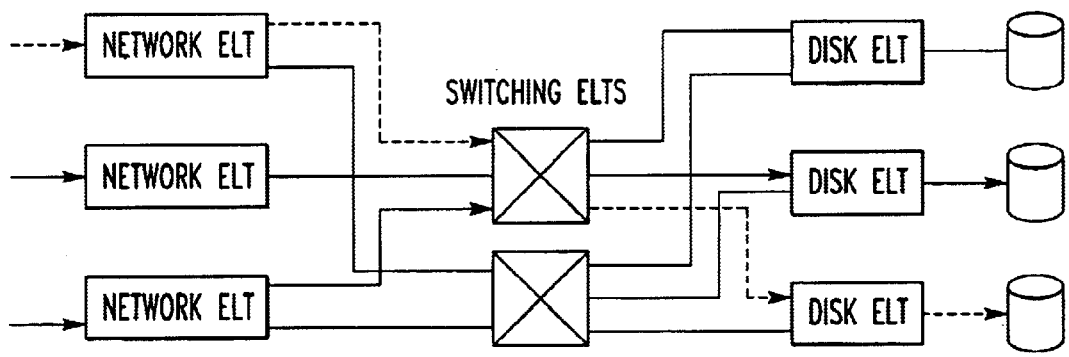
FIG. 8 is a schematic representation of the present invention.

In FIG. 8, the network element 16 receiving the dashed request consults its file system 10 location database 20 to determine where the file mentioned in the request is located. The database 20 indicates that the dashed file is located on the dashed disk, and gives the address of the disk element 12 to which this disk is attached. The network element 16 then sends the SpinFS request using RF over the switched fabric 14 to that disk element 12. Similarly, a request arriving at the bottom network element 16 is forwarded to the disk element 12 attached to the dotted line disk.

Failover is now described. Failover is supported by the system 10 by peering pairs of disk elements 12 together for a particular file system 10, so that updates from one disk element 12 can be propagated to the peer disk element 12. The updates are propagated over the switching network, using the RF protocol to provide a reliable delivery mechanism.

There are two sites involved in a failover configuration: the active site and the passive site. The active site receives incoming requests, performs them, and, before returning an acknowledgement to the caller, also ensures that the updates made by the request are reflect in stable storage (on disk or in non-volatile NVRAM) on the passive site.

In the system 10, the disk element 12 is responsible for ensuring that failover works. When an update is performed by the disk element 12, a series of RF calls are made between the active disk element 12 and the passive disk element 12, sending the user data and transactional log updates performed by the request. These updates are stored in NVRAM on the passive disk element 12, and are not written out to the actual disk unless the active disk element 12 fails.

Since the passive disk element 12 does not write the NVRAM data onto the disk, it needs an indication from the active server as to when the data can be discarded. For normal user data, this indication is just a call to the passive disk element 12 indicating that a buffer has been cleaned by the active element. For log data, this notification is just an indication of the log sequence number (LSN) of the oldest part of the log; older records stored at the passive element can then be discarded.

Figure 9:
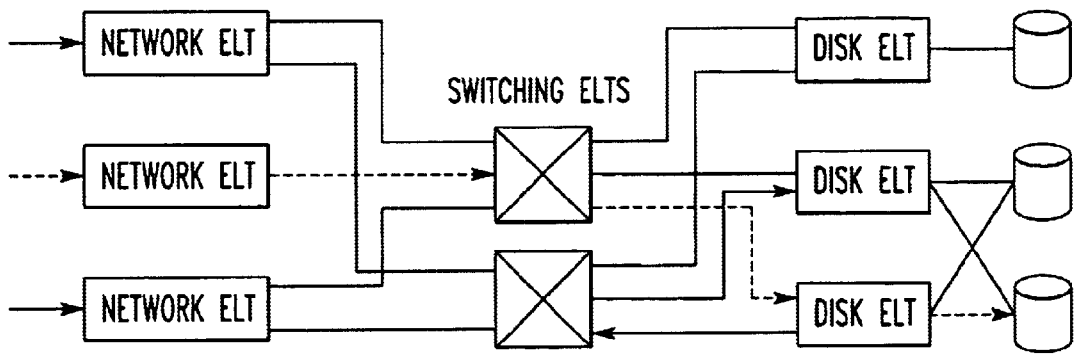
FIG. 9 is a schematic representation of two disk elements that form a failover pair.

In FIG. 9, the bottom two disk elements 12 make up a failover pair, and are able to step in to handle each other's disks (the disks are dual-attached to each disk element 12).

Figure 10:
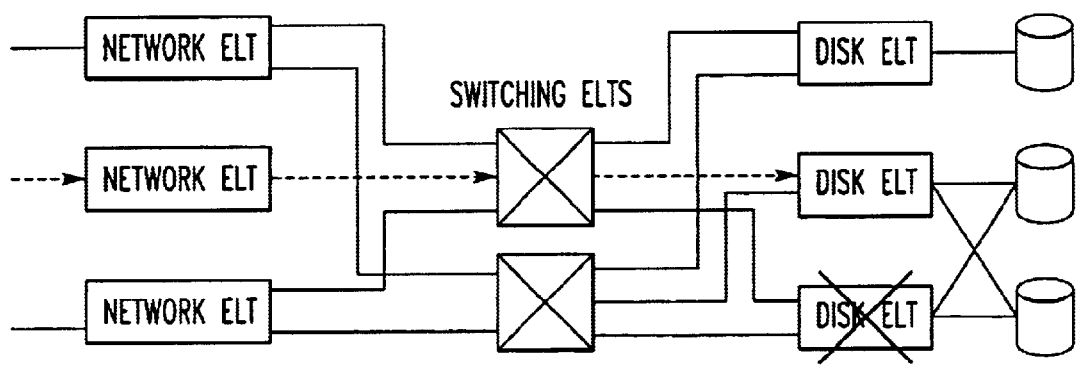
FIG. 10 is a schematic representation of a system with a failed disk element.

The requests drawn with a dashed line represent the flow of the request forwarded from the network element 16 to the active disk element 12, while the request in a dotted line represents the active element forwarding the updated data to the passive disk element 12. After a failure, requests are forwarded directly to the once passive disk element 12, as can be seen in FIG. 10 in the dashed line flow.

Replication is now described. Replication is handled in a manner analogous to, but not identical to, failover. When the system 10 is supporting a replicated file system 10, there is a writing disk element 12 and one or more read-only disk elements 12. All writes to the system 10 are performed only at the writing disk element 12. The network elements 16 forward read requests to read-only disk elements 12 in a round-robin fashion, to distribute the load among all available disk elements 12. The network elements 16 forward write requests (or any other request that updates the file system 10 state) to the writing disk element 12 for that file system 10.

The writing element forwards all user data, and the update to the log records for a file system 10 from the writing site to all read-only elements, such that all updates reach the read-only element's NVRAM before the writing site can acknowledge the request. This is the same data that is forwarded from the active to the passive elements in the failover mechanism, but unlike the failover case, the read-only elements actually do write the data received from the writing site to their disks.

All requests are forwarded between disk elements 12 using the RF remote procedure call protocol over the switched fabric 14.

The clustering architecture of the system 10 is crucial to this design, since it is the responsibility of the network elements 16 to distribute the load due to read requests among all the read-only disk elements 12, while forwarding the write requests to the writing disk element 12.

Figure 11:
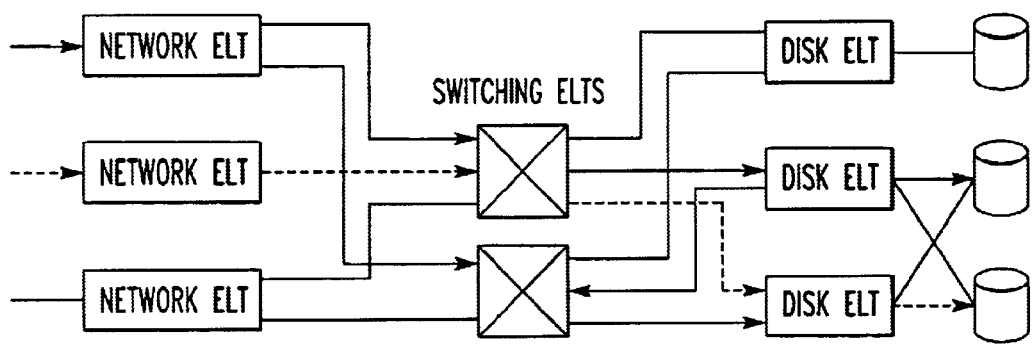
FIG. 11 is a schematic representation of the present invention in regard to replication.

FIG. 11 shows a dotted write request being forwarded to the writing disk element 12 (the middle disk element 12), while a dashed read request is forwarded by a network element 16 to a read-only disk element 12 (the bottom disk element 12). The writing disk element 12 also forwards the updates to the read-only disk element 12, as shown in the green request flow (from the middle disk element 12 to the bottom disk element 12).

Figure 12:
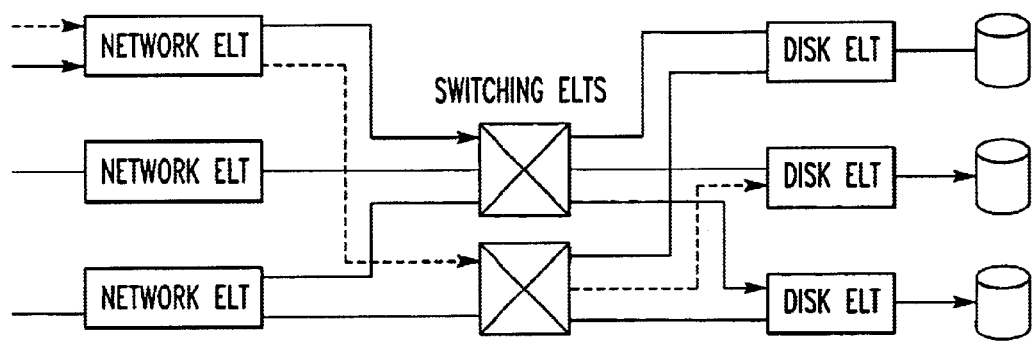
FIG. 12 is a schematic representation of the present invention in regard to data movement.

Data movement is now described. One additional management operation that the system 10 supports is that of transparent data movement. A virtual file system 10 can be moved from one disk element 12 to another transparently during normal system 10 operation. Once that operation has completed, requests that were forwarded to one disk element 12 are handled by updating the forwarding tables used by the network elements 16 to forward data to a particular file system 10. In FIG. 12, a file system 10 is moved from the bottom disk element 12 to the middle disk element 12. Initially requests destined for the file system 10 in question were sent to the dotted disk, via the dotted path. After the data movement has been performed, requests for that file system 10 (now drawn with dashed lines) are forwarded from the same network element 16 to a different disk element 12.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for responding to file system requests having file IDs comprising V, a volume identifier specifying the file system being accessed, and R, an integer, specifying the file within the file system being accessed comprising:

D disk elements in which files are stored, where D is greater than or equal to 1 and is an integer;

a switching fabric connected to the D disk elements to route requests to a corresponding disk element; and N network elements connected to the switching fabric, each network element having a mapping function that for every value of V, specifies one or more elements from the set D that store the data specified by volume V, where N is greater than or equal to 1 and is an integer and N+D is greater than or equal to 3, which receives the requests and causes the switching fabric to route the requests by their file ID according to the mapping function, each network element includes a translator which obtains file IDs from path names included in individual file system requests, each disk element and each network element has a file system location database which maintains a mapping from all file system identifiers V to disk element identifiers so each network element can translate each file system request ID into a corresponding disk element location, each disk element and each network element has a controller, and each disk element controller communicates with the network element controllers to identify which files are stored at the respective disk element, each network element can respond to any request for any disk element, each network element has a network port through which requests are received by the respective network element wherein all the network elements and disk elements together appear as a single system that can respond to any request at any network port of any network element, the disk elements form a cluster, with one of the disk elements being a cluster coordinator which communicates with each disk element in the cluster to collect from and distribute to the network elements which file systems are stored in each disk element of the cluster at predetermined times.

2. A system as described in claim 1 wherein the cluster coordinator determines if each disk element is operating properly and redistributes requests for any disk element that is not operating properly; and allocates virtual network interfaces to network elements and assigns responsibility for the virtual network interfaces to network elements for a failed network element.

3. A system as described in claim 2 wherein network elements and disk elements can be added dynamically.

4. A system as described in claim 3 wherein each network element advertises the virtual interfaces it supports to all disk elements.

5. A system as described in claim 4 wherein each disk element has all files with the same file system ID for one or more values of V.

6. A system as described in claim 5 wherein each request has an active disk element and a passive disk element associated with each request, wherein if the active disk element fails, the passive disk element is used to respond to the request.

7. A system as described in claim 5 wherein the requests include NFS requests.

8. A system as described in claim 7 wherein the requests include CIFS requests.

9. A system as described in claim 8 wherein the translator obtains the file IDs from path names contained within CIFS requests.

10. A method for responding to file system requests comprising the steps of:

receiving file system requests having file IDs comprising V, a volume identifier specifying the file system being accessed, and R, an integer, specifying the file within the file system being accessed at a network port of network elements which can respond to any requests, each having a mapping function that for every value of V, specifies one or more elements from the set D that store the data specified by volume V, all the network elements and disk elements together appear as a single system;

obtaining the ID from path names included in the requests with a translator of the network element;

routing the requests to a switching fabric connected to the network elements based on the file system request's ID according to the mapping function to disk elements connected to the switching fabric, maintaining all disk element locations at each file system location database of each disk element and each network element so each network element can translate each file system request ID into a corresponding disk element location; and collecting from and distributing to the disk elements and the network elements, which form a cluster, which file systems are stored in each disk element by a cluster coordinator, which is one of the disk elements of the cluster, at predetermined times.

11. A method as described in claim 10 wherein the routing step includes the step of redistributing requests from any disk elements which are not operating properly to disk elements which are operating properly by the network elements which receive the requests.

12. A method as described in claim 11 wherein after the routing step, there is the step of adding dynamically network elements and disk elements to the cluster so the cluster appears as one server and any host connected to any network port can access any file located on any disk element.

13. A method as described in claim 12 wherein before the receiving step, there is the step of advertising by each network element each virtual interface it supports.

14. A method as described in claim 13 wherein the obtaining step includes the step of obtaining ID requests by the translator of the network element from path names contained in a CIFS request.

* * * * *